United States Patent Office 2,944,075
Patented July 5, 1960

2,944,075
METHOD OF PRODUCING PHOSPHORIC ACID AND THIOPHOSPHORIC ACID DERIVATIVES

Arno Debo, Heidelberg, Germany, assignor to Joh. A. Benckiser, G.m.b.H. Chemische Fabrik, Ludwigshafen (Rhine), Germany No Drawing. Filed Dec. 19, 1957, Ser. No. 703,742

Claims priority, application Germany Dec. 22, 1956

5 Claims. (Cl. 260—461)

The present invention relates to new phosphoric and thiophosphoric acid derivatives, and more particularly to diamine-N-N'-diphosphoric and dithiophosphoric acid derivatives, and to methods of producing these compounds.

It is a primary object of the present invention to provide for the production of new compounds.

It is another object of the present invention to provide for the production of diamine-N-N'-diphosphoric and dithiophosphoric acid derivatives having the following general formula:

(I)    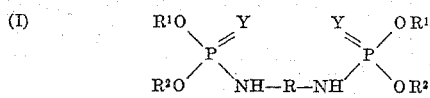

wherein $R^1$ and $R^2$ are alkyl or aryl groups, wherein Y is oxygen or sulfur, and wherein R is a divalent chain radical or a divalent ring radical in which the chain or ring is either formed solely of carbon atoms as the linking atoms or of carbon atoms plus another atom or group such as the groups:

—NH—, —CO—, —O—, —S—, or =CHOH

It is still another object of the present invention to provide a simple method of producing compounds of the above type in practically quantitative yield.

Other objects and advantages of the present invention will be apparent from a further reading of the specification and of the appended claims.

With the above objects in view, the method of producing the new diamine-N-N'-diphosphoric or dithiophosphoric acid derivatives having the following general formula:

I)    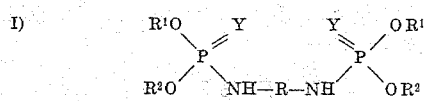

wherein $R^1$ and $R^2$ are selected from the groups consisting of alkyl and aryl groups, wherein Y is selected from the group consisting of oxygen and sulfur, and wherein R is selected from the group consisting of divalent chain radicals and divalent ring radicals, comprises the steps of reacting a diamine having the following general formula:

(II)    $H_2N$—R—$NH_2$ wherein R has the same definition as above, with a halogen-phosphoric acid-diester having the following general formula:

III   

wherein $R^1$ and $R^2$ have the same definition as above and wherein X is a halogen atom in an aqueous medium containing an inorganic base such as sodium carbonate in solution, and recovering the thus-formed diamine-N-N'-diphosphoric acid or dithiophosphoric acid derivative.

Assuming the use of sodium carbonate as the inorganic base, the reaction in accordance with the present invention proceeds as follows:

(IV)

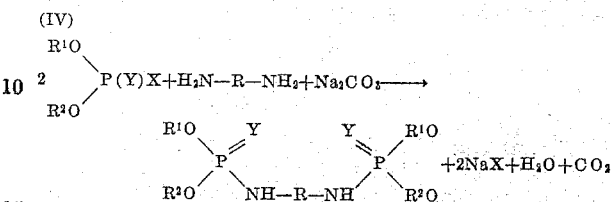

Any diamine falling within the general formula (II) above may be utilized to produce the compounds of the present invention. The substituent R may be a divalent straight chain radical containing only carbon atoms as the chain-forming atoms, for example alkylene radicals of 2–18 carbon atoms, preferably of 2–6 carbon atoms, such as:

—$CH_2$—$CH_2$—
—$CH_2$—$CH_2$—$CH_2$—
—$CH_2$—$CH_2$—$CH_2$—$CH_2$—
—$CH_2$—$CH_2$—$CH_2$—$CH_2$—$CH_2$—
—$CH_2$—$CH_2$—$CH_2$—$CH_2$—$CH_2$—$CH_2$—

Thus, the diamine may be an alkylene diamine such as ethylene diamine, propylene diamine, butylene diamine or the like.

The substituent R may also be a straight chain radical in which the chain is formed of atoms other than carbon atoms in addition to the carbon atoms, as for example in the case of the following compounds which fall within the above general Formula II: diethylene triamine; triethylene tetramine; dipropylene triamine; tripropylene tetramine; 1,3-diamino-propanone(2); diamino-diethyl ether; diamino-dipropyl ether; diamino-diethyl thioether; 1,3-diamino-propanol(2); and the like.

The substituent R may also be a divalent ring radical such as the following carbocyclic radicals:

—$C_6H_4$— (phenylene)
—$C_6H_4$—$C_6H_4$— (benzidine)
—$C_{10}H_6$— (naphthylene)

Likewise, the substituent R may be a heterocyclic ring radical such as the divalent pyridine radical.

The method of the present invention can be carried out utilizing any halogen phosphoric acid diester falling within the general Formula III above. The following is a list of some suitable chloro-phosphoric or thiophosphoric acid-dialkyl esters which may be utilized in accordance with the present invention:

$ClP(O)(OCH_3)_2$
$ClP(O)(OC_2H_5)_2$
$ClP(O)(OC_3H_7)_2$
$ClP(O)(O\ iso$—$C_3H_7)_2$
$ClP(O)(OC_4H_9)_2$
$ClP(O)(O\ iso$—$C_4H_9)_2$
$ClP(O)(O\ iso$—$C_5H_{11})_2$
$ClP(S)(OCH_3)_2$
$ClP(S)(OC_2H_5)_2$
$ClP(S)(OC_3H_7)_2$
$ClP(S)(O\ iso$—$C_3H_7)_2$
$ClP(S)(OC_4H_9)_2$
$ClP(S)(O\ iso$—$C_4H_9)_2$
$ClP(S)(O\ iso$—$C_5H_{11})_2$ Naturally the corresponding bromine esters of the above compounds can be used in place of the chlorine esters. Likewise, mixed esters can be used, as for example the following:

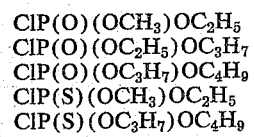

ClP(O)(OCH₃)OC₂H₅
ClP(O)(OC₂H₅)OC₃H₇
ClP(O)(OC₃H₇)OC₄H₉
ClP(S)(OCH₃)OC₂H₅
ClP(S)(OC₃H₇)OC₄H₉

The following are among the suitable halogen phosphoric acid-diaryl esters that may be utilized as starting material in accordance with the present invention:

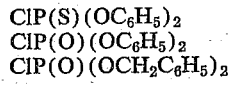

ClP(S)(OC₆H₅)₂
ClP(O)(OC₆H₅)₂
ClP(O)(OCH₂C₆H₅)₂

The reaction of a diamine, Formula II, with a halogen phosphoric acid diester, Formula III in an aqueous medium containing an inorganic base such as sodium carbonate in solution can produce in quantitative yield a great variety of compounds falling within general Formula I above. The compounds which are thus produced are extremely useful as sequestering agents, as well as intermediate compounds for pharmaceutical, fungicidal, and insecticidal purposes. Among the new compounds which are produced in accordance with the present invention are the following:

Ethylenediamine - N,N' - bis - phosphoric acid - di - n-propyl ester
Ethylenediamine - N,N' - bis - phosphoric acid - di - iso-propyl ester
Diethylenetriamine - N,N' - bis - phosphoric acid - di - n-propyl ester
Diethylenetriamine - N, N' - bis - phosphoric acid - di - n-butyl ester
p - Phenylenediamine - N,N' - bis - phosphoric acid - di-n-propyl ester
p - Phenylenediamine - N,N' - bis - phosphoric acid - di-n-butyl ester
p - Phenylenediamine - N,N' - bis - phosphoric acid - di-iso-butyl ester
Benzidine-N,N'-bis-phosphoric acid-di-n-propyl ester
Ethylenediamine - N,N' - bis - thiophosphoric acid - di-n-propyl ester
p - Phenylenediamine - N,N' - bis - thiophosphoric acid-di-ethyl ester
Propylenediamine - N,N' - bis - phosphoric acid - di-propyl ester
Propylenediamine - N,N' - bis-phosphoric acid - diphenyl ester
Hexamethylenediamine-N,N'-bis-phosphoric acid-di-butyl ester
Dipropylenetriamine - N,N' - bis - phosphoric acid - di-benzyl ester
Hexamethylene-diamine-N,N'-bis-phosphoric acid-diphenylester
1,2-diaminopropane-N,N'-bis-phosphoric acid-di-n-propyl-ester
4,4' - diamino - diphenylmethane - N,N' - bis - phosphoric acid diphenylester
1,8-naphthalenediamine-N,N'-bis-phosphoric acid-di-n-butylester
1,8-naphthalenediamine-N,N'-bis-phosphoric acid di-phenylester
Hexamethylenediamine-N,N'-bis-thio-phosphoric acid-di-methylester In accordance with the method of the present invention the above and similar compounds can be produced in practically quantitative yield by carrying out the reaction between the diamine, Formula II, and the halogen phosphoric acid diester, Formula III in aqueous medium in the presence of an inorganic base such as sodium carbonate which will bind the freed hydrogen halide, e.g. hydrogen chloride. Among the suitable inorganic bases which may be utilized in accordance with the present invention are sodium carbonate, sodium hydroxide, ammonium hydroxide, potassium carbonate, potassium hydroxide, and calcium hydroxide. Of course, the cheapest inorganic bases are most desirable from the point of view of economy, as for example sodium hydroxide and sodium carbonate. The concentration of the inorganic bases in the aqueous solution may vary for example between 5 and 30%, the most preferred concentration being about 20% by weight.

The method of the present invention is most conveniently carried out by suspending or dissolving the particular diamine corresponding to Formula II above, or its hydrochloride in aqueous solution of an inorganic base such as sodium carbonate. The particular amount of the halogen phosphoric acid diester is then added under stirring, and if necessary under cooling. The reaction mixture is subsequently diluted with water and the resulting alkyl or aryl diamine-N,N'-bis-phosphoric acid-diester is separated. Preferably the reaction mixture is first neutralized before separating the reaction product from the reaction mixture.

Since the reaction proceeds practically quantitatively, molecular amounts which will give a complete reaction are preferred. Thus, it is preferred to utilize the halogen phosphoric acid, the diamine and the inorganic base such as sodium carbonate in a molecular ratio of 2:1:1, since this ratio gives rise to practically quantitative yields.

The following examples are given to more fully illustrate the present invention. The scope of the invention is, however, not meant to be limited to the specific details of the examples.

EXAMPLE 1

*Production of ethylenediamine-N,N'-bis-phosphoric acid-di-n-propyl ester*

(V)

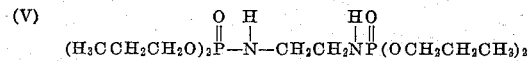

$(H_3CCH_2CH_2O)_2\overset{O}{\underset{\parallel}{P}}-\overset{H}{\underset{|}{N}}-CH_2CH_2\overset{H}{\underset{|}{N}}\overset{O}{\underset{\parallel}{P}}(OCH_2CH_2CH_3)_2$ 60.3 g. of monochlorophosphoric acid-di-n-propyl ester is added dropwise while stirring during a time period of about 15 minutes to 9.7 g. of ethylenediamine in 195 cc. of 20% aqueous sodium carbonate solution. After an additional 5 minutes approximately 350 cc. of water are added to the reaction mixture and the oily layer is separated in a separatory funnel. It is dried over sodium sulfate. By filtration from the drying agent the desired compound precipitates in crystalline form. The yield is 51 g. which is equivalent to 88% of the theoretical. The melting point (after recrystallization from n-hexane) is 81° C. This product is a sequestering agent. It may also be utilized as an intermediate product for pharmaceutical, fungicidal, and insecticidal purposes.

EXAMPLE 2

*Production of ethylenediamine-N,N'-bis-phosphoric acid-di-iso-propyl ester*

(VI)

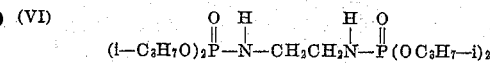

$(i-C_3H_7O)_2\overset{O}{\underset{\parallel}{P}}-\overset{H}{\underset{|}{N}}-CH_2CH_2\overset{H}{\underset{|}{N}}-\overset{O}{\underset{\parallel}{P}}(OC_3H_7-i)_2$ 80.2 g. of monochlorophosphoric acid-di-iso-propyl ester are added dropwise under stirring to 12.8 g. of 94% ethylenediamine in 260 cc. of 20% aqueous sodium carbonate solution. After completion of the dropwise addition the stirring is continued for an additional 10 minutes and then about 400 cc. of water are added to the reaction mixture. The resulting oily layer is separated in a separatory funnel and dried over sodium sulfate. Upon filtration the desired compound crystallizes out. An additional amount of the compound can be washed out of the sodium sulfate by means of hexane. The yield amounts to 68% of the theoretical. The melting point (after recrystallization from n-hexane) is 84° C.

EXAMPLE 3

Production of diethylenetriamine - N,N' - bis-phosphoric acid-di-n-propyl ester (VII)  (n—C₃H₇O)₂P(O)HNCH₂CH₂NHCH₂C₂NH
                                    (O)(OC₃H₇—n)₂

40.1 g. of monochlorophosphoric acid-di-n-propyl ester are added dropwise to 10.3 g. of diethylenetriamine, 71 g. of Na₂CO₃.10H₂O and 80 cc. of water. The reaction mixture is thoroughly stirred during the dropwise addition. At completion of the dropwise addition the stirring is continued for an additional ¼ hour, the oily layer is then separated in a separatory funnel and dried over sodium sulfate. 42 g. of the desired compound are obtained. The yield is equivalent to 97.5% of the theoretical. The phosphorous content upon calculation=14.38%; the amount found is 14.4%. $n_D^{18}=1.4470$.

EXAMPLE 4

Production of diethylenetriamine - N,N' - bis - phosphoric acid-di-n-butyl ester (VIII)  (n—C₄H₉O)₂P(O)HNCH₂CH₂NHCH₂CH₂NHP
                                    (O)(OC₄H₉—n)₂

89.8 g. of monochlorophosphoric acid di-n-butyl ester are added dropwise under thorough stirring to 20.6 g. of diethylenetriamine and 143 g. of Na₂CO₃.10H₂O in 120 cc. of water. After the completion of the addition the stirring is continued for an additional 30 minutes and the reaction mixture is then brought, by means of hydrochloric acid, to a pH value of 7–8. The oil is separated and is then dried over sodium sulfate. There is thus obtained 95 g. of the desired compound which corresponds to a yield of approximately 100% of the theoretical. The phosphorous content by calculation is 12.95%, and the content of phosphorous found by analysis is 12.9%. $n_D^{20}=1.4540$.

EXAMPLE 5

Production of p-phenylenediamine - N,N' - bis-phosphoric acid-di-n-propylester (IX) 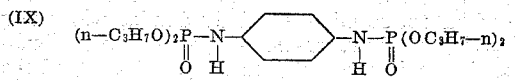

60 g. of monochlorophosphoric acid-di-n-propyl ester are added dropwise under stirring to a beaker glass containing 2 mixture of 300 cc. of 20% aqueous sodium carbonate solution and 27 g. of p-phenylenediamine hydrochloride. After completion of the addition the stirring is continued for about another 15 minutes and the reaction mixture is then neutralized with 2 n HCl. The reaction mixture is subjected to suction filtration and the residue is dried. Upon recrystallization from ethanol the product is found to have a melting point of 174° C. The yield amounts to 59 g.=90.4% of the theoretical. The calculated phosphorous content is 14.2%, and the amount found by analysis is 14.5%. The calculated nitrogen content is 6.4% and the amount found by analysis is 6.2%.

EXAMPLE 6

Production of p-phenylenediamine - N,N' - bis-phosphoric acid-di-n-butyl ester (X)  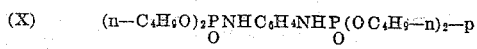

91.5 g. of monochlorophosphoric acid-di-n-butyl ester are added dropwise under vigorous stirring to 36.2 g. of p-phenylenediamine hydrochloride and 117 g. of Na₂CO₃.10H₂O in 150 cc. of water. The precipitate is separated by suction filtration and washed with water containing hydrogen chloride. After drying the same is crystallized from ethanol. There is thus obtained 97 g. of the desired compound having a melting point of 144° C. The yield is equivalent to a yield of approximately 100% of the theoretical.

EXAMPLE 7

Production of p-phenylenediamine - N,N' - bis-phosphoric acid-di-iso-butyl ester (XI)  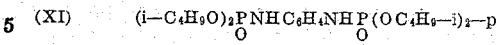

The production of the above compound proceeds in accordance with Example 2 utilizing 91.5 g. of monochlorophosphoric acid-di-iso-butyl ester. The yield is 87% of the theoretical. The melting point of the compound after recrystallization from ethanol is 195° C.

EXAMPLE 8

Production of benzidine - N,N'-bis - phosphoric acid-di-n-propyl ester (XII) 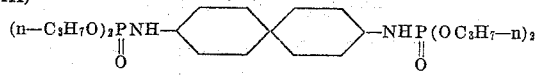

40.1 g. of monochlorophosphoric acid-di-n-propyl ester are added dropwise under vigorous stirring to 18.4 g. of diphenylenediamine and 63 g. of Na₂CO₃.10H₂O in 180 cc. of water. At the completion of the addition the stirring is continued for another 15 minutes and the precipitate is separated by suction filtration. The precipitate is washed with dilute hydrochloric acid and water and then dried. The yield amounts to 50.75 g. which corresponds to 99% of the theoretical. The melting point after recrystallization from methanol is 211° C.

EXAMPLE 9

Production of ethylenediamine-N,N' - bis - thiophosphoric acid-di-n-propyl ester (XIII)  (n—C₃H₇O)₂P(S)NHCH₂CH₂NHP
                                (S)(OC₃H₇—n)₂

42 g. of monochlorothiophosphoric acid-di-n-propyl ester are added slowly by dropwise addition into a glass beaker under vigorous stirring to 130 cc. of 20% aqueous sodium carbonate solution and 6.3 g. of ethylenediamine. After the completion of the addition the reaction mixture is stirred for an additional 30 minutes. Afterwards 500 cc. of water are added and an oily sublayer is separated. The layer is separated in a separatory funnel and dried over sodium sulfate. The compound is a colorless oil. $n_D^{20}=1.4821$. Upon analysis the calculated amount of phosphorous is found to be 14.75% and the amount actually found is 14.8%. The calculated amount of sulfur is 15.2% and the amount found upon analysis is 14.8%.

EXAMPLE 10

Production of p-phenylenediamine-N,N'-bis-thiophosphoric acid-diethyl ester (XIV)  (C₂H₅O)₂P(S)NHC₆H₄NHP(S)(OC₂H₅)₂—p 9.8 g. of phenylenediamine hydrochloride are suspended in an aqueous solution containing 75 cc. of water and 31 g. of Na₂CO₃.10H₂O. 18.9 g. of monochlorothiophosphoric acid-diethyl ester are added under vigorous stirring, the addition being dropwise. At the completion of the dropwise addition the stirring is continued for an additional 15 minutes and the crystalline mass is separated by suction filtration. After washing with water the desired compound is obtained. After recrystallization from ethanol the compound has a melting point of 177° C. The calculated amount of phosphorous is 15.1% and the amount found upon analysis is 15.1%. The calculated amount of sulfur is 15.6% and the amount found upon analysis is 15.5%.

EXAMPLE 11

Production of ethylenediamine-N,N'-bis-phosphoric acid-diphenyl ester (XV)  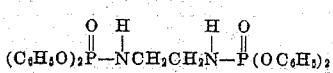

53.8 g. of monochlorophosphoric acid-diphenyl ester are added dropwise while vibrating to 7.8 g. of ethylenediamine hydrate in 100 cc. of 20% aqueous sodium carbonate solution. At the completion of the dropwise addition the vibration is continued for an additional 15 minutes and then approximately 250 cc. of water are added to the reaction mixture. The white precipitate is filtered off and then dried for 2 hours at 100° C. There is thus obtained 45 g. of the desired compound having a melting point, after recrystallization from benzene, of 130° C. This compound is soluble in alcohol, benzene, and dioxane; it is insoluble in water, hexane and cyclohexane.

EXAMPLE 12

*Production of hexamethylene-diamine-N,N'-bis-phosphoric acid-diphenylester*

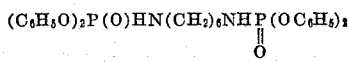

107.4 g. of monochlorophosphoric acid-diphenylester are added dropwise under vigorous stirring to 23.2 g. hexamethylenediamine and 57.2 g. of $Na_2CO_3 \cdot 10H_2O$ in 50 cc. of water. The precipitate is separated by suction filtration and washed with water until the filtrate is free of chloride. There is thus obtained 97 g. of the desired compound having a melting point of 114°. The yield is 100% of the theoretical. The calculated phosphorus content is 10.69% and the amount found by analysis is 10.9%. The calculated nitrogen content is 4.83% and the amount found by analysis is 4.8%.

This compound is insoluble in water, poor soluble in ether and soluble in alcohol and benzene.

EXAMPLE 13

*Production of 1,2-diaminopropane-N,N'-bis-phosphoric acid-di-n-propylester*

$(C_3H_7O)_2P(O)HNCH_2CH(CH_3)NHP(O)(OC_3H_7)_2$ 40.1 g. of monochlorophosphoric acid-di-n-propylester are added dropwise under vigorous vibration to 7.4 g. of 1,2-diamino-propane and 100 cc. of a 20% aqueous sodium carbonate solution within 30 minutes. At the completion of the dropwise addition the vibration is continued for an additional 30 minutes. After diluting the reaction mixture with water the resulting oil is separated in a separating funnel and dried over sodium sulfate. There is thus obtained 33 g. of the desired compound. $n_D^{20}=1.4405$. The calculated amount of phosphorus is 15.45% and the amount found by analysis is 15.4%. The calculated amount of nitrogen is 6.97% and the amount found by analysis is 7.1%.

EXAMPLE 14

*Production of 4,4'-diamino-diphenylmethane-N,N'-bis-phosphoric acid diphenylester*

$(C_6H_5O)_2P(O)HNC_6H_4CH_2C_6H_4NHP(O)(OC_6H_5)_2$ 53.7 g. of monochlorophosphoric acid diphenylester are added dropwise under vigorous vibration to 19.8 g. of 4,4'-diamino-diphenyl-methane and 57.2 g. of $$Na_2CO_3 \cdot 10H_2O$$

in 50 cc. of water. At the completion of the dropwise addition the vibration is continued for an additional 15 minutes. Then, 100 cc. of water are added to the reaction mixture and the whole filtrated. The residue is then washed with water and dried. There are thus obtained 65 g. of the desired compound which is equal to 98.2% of the theoretical amount. M.P. 185°. The compound is readily soluble in alcohol, acetone, chloroform, benzene and toluol, poor soluble in xylol and insoluble in water, $CCl_4$, hexane and cyclohexane.

EXAMPLE 15

*Production of 1,8-naphthalenediamine-N,N'-bis-phosphoric acid-di-n-butylester*

$(n-C_4H_9O)_2P(O)HNC_{10}H_6NHP(O)(OC_4H_9-n)_2$ 45.7 g. of monochlorophosphoric acid dibutylester are added dropwise under vigorous stirring to 15.8 g. of 1,8-naphthalenediamine and 21.2 g. of sodium carbonate in 80 cc. of water. At the completion of the dropwise addition the vibration is continued for an additional 30 minutes. After separating the resulting oil, the latter is washed with water and then dried.

P calc. 11.44%; found 11.4 and 11.5%. N calc. 5.17%; found 5.1%.

EXAMPLE 16

*Production of 1,8-naphthalenediamine-N,N'-bis-phosphoric acid-di-phenylester*

$(C_6H_5O)_2P(O)HN \cdot C_{10}H_6 \cdot NHP(O)(OC_6H_5)_2$ 15.8 g. of 1,8-naphthalenediamine are suspended in 100 cc. of 20% aqueous sodium carbonate solution. Then, 53.7 g. of monochloric phosphoric acid diphenylester are added dropwise while vibrating within 45 minutes. At the completion of the dropwise addition the vibration is continued for another 30 minutes. The red precipitate is filtered off, recrystallized from ethanol and washed with ether. There are thus obtained pink crystals having a melting point of 208°. Yield 48 g. which is equal to 72.2% of the theoretical amount.

EXAMPLE 17

*Production of hexamethylendiamine-N,N'-bis-thio-phosphoric acid-diethylester*

$(C_2H_5O)_2P(S)HN(CH_2)_6NHP(S)(OC_2H_5)_2$ 37.7 g. of monochlorothiophosphoric acid diethylester are added dropwise under vigorous vibrating to a suspension of 11.6 g. of hexamethylendiamine in 100 cc. of 20% aqueous sodium carbonate solution. At the completion of the dropwise addition the vibration is continued for an additional 30 minutes. After diluting with water the resulting oil is separated and dried over sodium-sulfate. There is thus obtained 35 g. (83.4%) of the desired compound. $n_D^{20}=1.498$.

P: calc. 14.77%; found 18.8%
N: calc. 6.66%; found 6.2%
S: calc. 15.23; found 15.1%

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a diamine-N-N'-bis-phosphoric acid derivative having the following general formula:

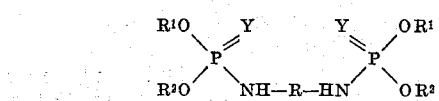

wherein $R^1$ and $R^2$ are selected from the group consisting of lower alkyl and phenyl, tolyl and hydroxyl-tolyl radicals, wherein Y is selected from the group consisting of oxygen and sulfur, and wherein R is selected from the group consisting of divalent alkylene radicals of 2–18 carbon atoms and divalent diethylene amine, triethylene diamine, 1,2-propane, dipropylene amine, tripropylene diamine, 1,3-propanone (2), diethyl ether, dipropyl ether, diethyl thioether, 1,3-propanol (2), phenylene, benzidine, naphthylene, and 4,4'-diphenylmethane radicals, comprising the steps of reacting a diamine having the following general formula:

$$H_2N-R-NH_2$$

wherein R has the same definition as above with a halogen phosphoric acid-diester having the following general formula:

$$\begin{array}{c} R^1O \\ \phantom{R^1O}\diagdown \\ \phantom{R^1O}\phantom{\diagdown} P(Y)X \\ \phantom{R^1O}\diagup \\ R^2O \end{array}$$

wherein $R^1$, $R^2$ and Y have the same definitions as above and wherein X is a halogen atom in a ratio of two mols of said halogen phosphoric acid-diester per each mol of said diamine in an aqueous medium containing an inorganic base in solution; and recovering the thus-formed diamine-N-N'-bis-phosphoric acid derivative.

2. A method of producing a diamine-N-N'-bis-phosphoric acid derivative having the following general formula:

$$\begin{array}{c} R^1O \phantom{aa} Y \phantom{aaaaaaa} Y \phantom{aa} OR^1 \\ \diagdown \phantom{a} \diagup \phantom{aaaaaaa} \diagdown \phantom{a} \diagup \\ P \phantom{aaaaaaaaaaaaa} P \\ \diagup \phantom{a} \diagdown \phantom{aaaaaaa} \diagup \phantom{a} \diagdown \\ R^2O \phantom{a} NH-R-HN \phantom{a} OR^2 \end{array}$$

wherein $R^1$ and $R^2$ are selected from the group consisting of lower alkyl and phenyl, tolyl and hydroxy-tolyl radicals, wherein Y is selected from the group consisting of oxygen and sulfur, and wherein R is selected from the group consisting of divalent alkylene radicals of 2–18 carbon atoms and divalent diethylene amine, triethylene diamine, 1,2-propane, dipropylene amine, tripropylene diamine, 1,3-propanone (2), diethyl ether, dipropyl ether, diethyl thioether, 1,3-propanol (2), phenylene, benzidine, naphthylene, and 4,4'-diphenylmethane radicals, comprising the steps of adding a halogen phosphoric acid-diester having the following general formula:

$$\begin{array}{c} R^1O \\ \phantom{R^1O}\diagdown \\ \phantom{R^1O}\phantom{\diagdown} P(Y)X \\ \phantom{R^1O}\diagup \\ R^2O \end{array}$$

wherein $R^1$, $R^2$ and Y have the same definitions as above and wherein X is a halogen atom to an aqueous solution of an inorganic base containing a diamine having the following general formula:

$$H_2N-R-NH_2$$

wherein R has the same definition as above in a ratio of two mols of said halogen phosphoric acid-diester per each mol of said diamine; and recovering the thus-formed diamine-N-N'-bis-phosphoric acid derivative.

3. A method of producing a diamine-N-N'-bis-phosphoric acid derivative having the following general formula:

$$\begin{array}{c} R^1O \phantom{aa} Y \phantom{aaaaaaa} Y \phantom{aa} OR^1 \\ \diagdown \phantom{a} \diagup \phantom{aaaaaaa} \diagdown \phantom{a} \diagup \\ P \phantom{aaaaaaaaaaaaa} P \\ \diagup \phantom{a} \diagdown \phantom{aaaaaaa} \diagup \phantom{a} \diagdown \\ R^2O \phantom{a} NH-R-HN \phantom{a} OR^2 \end{array}$$

wherein $R^1$ and $R^2$ are selected from the group consisting of lower alkyl and phenyl, tolyl and hydroxy-tolyl radicals, wherein Y is selected from the group consisting of oxygen and sulfur, and wherein R is selected from the group consisting of divalent alkylene radicals of 2–18 carbon atoms and divalent diethylene amine, triethylene diamine, 1,2-propane, dipropylene amine, tripropylene diamine, 1,3-propanone (2), diethyl ether, dipropyl ether, diethyl thioether, 1,3-propanol (2), phenylene, benzidine, naphthylene, and 4,4'-diphenylmethane radicals, comprising the steps of reacting a diamine having the following general formula:

$$H_2H-R-NH_2$$

wherein R has the same definition as above with halogen phosphoric acid-diester having the following general formula:

$$\begin{array}{c} R^1O \\ \phantom{R^1O}\diagdown \\ \phantom{R^1O}\phantom{\diagdown} P(Y)X \\ \phantom{R^1O}\diagup \\ R^2O \end{array}$$

wherein $R^1$, $R^2$ and Y have the same definitions as above and wherein X is a halogen atom in a ratio of two mols of said halogen phosphoric acid-dieser per each mol of said diamine in an aqueous medium containing an inorganic base selected from the group consisting of sodium carbonate, sodium hydroxide, ammonium hydroxide, potassium hydroxide, potassium carbonate and calcium hydroxide in solution; and recovering the thus-formed diamine-N-N'-bis-phosphoric acid derivative.

4. A method of producing a diamine-N-N'-bis-phosphoric acid derivative having the following general formula:

$$\begin{array}{c} R^1O \phantom{aa} Y \phantom{aaaaaaa} Y \phantom{aa} OR^1 \\ \diagdown \phantom{a} \diagup \phantom{aaaaaaa} \diagdown \phantom{a} \diagup \\ P \phantom{aaaaaaaaaaaaa} P \\ \diagup \phantom{a} \diagdown \phantom{aaaaaaa} \diagup \phantom{a} \diagdown \\ R^2O \phantom{a} NH-R-HN \phantom{a} OR^2 \end{array}$$

wherein $R^1$ and $R^2$ are selected from the group consisting of lower alkyl and phenyl, tolyl and hydroxy-tolyl radicals, wherein Y is selected from the group consisting of oxygen and sulfur, and wherein R is selected from the group consisting of divalent alkylene radicals of 2–18 carbon atoms and divalent diethylene amine, triethylene diamine, 1,2-propane, dipropylene amine, tripropylene diamine, 1,3-propanone (2), diethyl ether, dipropyl ether, diethyl thioether, 1,3-propanol (2), phenylene, benzidine, naphthylene, and 4,4'-diphenylmethane radicals, comprising the steps of reacting a diamine having the following general formula:

$$H_2N-R-NH_2$$

wherein R has the same definition as above with a halogen-phosphoric acid-diester having the following general formula:

$$\begin{array}{c} R^1O \\ \phantom{R^1O}\diagdown \\ \phantom{R^1O}\phantom{\diagdown} P(Y)X \\ \phantom{R^1O}\diagup \\ R^2O \end{array}$$

wherein $R^1$, $R^2$ and Y have the same definition as above and wherein X is a halogen atom in a ratio of two mols of said halogen phosphoric acid-diester per each mol of said diamine in an aqueous medium containing about 5–30% of an inorganic base in solution; and recovering the thus-formed diamine-N-N'-bis-phosphoric acid derivative.

5. A method of producing a diamine-N-N'-bis-phosphoric acid derivative having the following general formula:

$$\begin{array}{c} R^1O \phantom{aa} Y \phantom{aaaaaaa} Y \phantom{aa} OR^1 \\ \diagdown \phantom{a} \diagup \phantom{aaaaaaa} \diagdown \phantom{a} \diagup \\ P \phantom{aaaaaaaaaaaaa} P \\ \diagup \phantom{a} \diagdown \phantom{aaaaaaa} \diagup \phantom{a} \diagdown \\ R^2O \phantom{a} NH-R-HN \phantom{a} OR^2 \end{array}$$

wherein $R^1$ and $R^2$ are selected from the group consisting of lower alkyl and phenyl, tolyl and hydroxy-tolyl radicals, wherein Y is selected from the group consisting of oxygen and sulfur, and wherein R is selected from the group consisting of divalent alkylene radicals of 2–18 carbon atoms and divalent diethylene amine, triethylene diamine, 1,2-propane, dipropylene amine, tripropylene diamine, 1,3-propanone (2), diethyl ether, dipropyl ether, diethyl thioether, 1,3-propanol (2), phenylene, benzidine, naphthylene, and 4,4'-diphenylmethane radicals, comprising the steps of adding a halogen-phosphoric acid-diester having the following general formula:

$$\begin{array}{c} R^1O \\ \phantom{R^1O}\diagdown \\ \phantom{R^1O}\phantom{\diagdown} P(Y)X \\ \phantom{R^1O}\diagup \\ R^2O \end{array}$$

wherein $R^1$, $R^2$ and Y have the same definitions as above and wherein X is a halogen atom to an aqueous solution of an inorganic base containing a diamine having the following general formula:

$$H_2N-R-NH_2$$

wherein R has the same definition as above, said halogen-phosphoric acid-diester, said inorganic base and said diamine being present in a mol ratio of approximately 2:1:1; and recovering the thus-formed diamine-N-N'-diphosphoric acid derivative.

References Cited in the file of this patent

UNITED STATES PATENTS 2,574,516 Walter et al. _____ Nov. 13, 1951

FOREIGN PATENTS 1,116,415 France _____ May 8, 1956